United States Patent
Kogelnik

[11] 4,013,000
[45] Mar. 22, 1977

[54] OPTICAL CROSSBAR SWITCHING NETWORK

[75] Inventor: Herwig Werner Kogelnik, Fair Haven, N.J.

[73] Assignee: Bell Telephone Laboratories, Incorporated, Murray Hill, N.J.

[22] Filed: Nov. 20, 1975

[21] Appl. No.: 633,719

[52] U.S. Cl. .................. 350/96 C; 350/96 WG
[51] Int. Cl.² .................................. G02B 5/14
[58] Field of Search ................. 350/96 C, 96 WG

[56] References Cited
UNITED STATES PATENTS

| | | | |
|---|---|---|---|
| 3,622,792 | 11/1971 | Piccininni | 250/199 |
| 3,871,742 | 3/1975 | Kaminow et al. | 350/96 C |
| 3,871,743 | 3/1975 | Fulenwider | 350/96 C |
| 3,904,270 | 9/1975 | Cheo | 350/96 C |

OTHER PUBLICATIONS

Taylor "Optical-Waveguide Connecting Networks" Electronics Letters vol. 10, No. 4, pp. 41–43 Feb. 74.

Primary Examiner—John K. Corbin
Assistant Examiner—Stewart Levy
Attorney, Agent, or Firm—Wilford L. Wisner; Daniel D. Dubosky

[57] ABSTRACT

An optical switching network employing a plurality of optical switching crosspoints is implemented by providing the first and second pluralities of strip waveguide channels passing one over the other in parallel planes separated by an intervening medium. The implementation is further characterized by including at each of the proposed switching crosspoints, that is, at the regions of closest approach of the different strip guides, beam-guide couplers such as grating-type couplers to couple the modulated optical energy from one of the first plurality of channels to one of the second plurality of channels through an intervening, supporting medium. There are provided two couplers at each optical crosspoint; and they are controllable between coupling and noncoupling conditions with respect to their respective waveguide channels.

7 Claims, 3 Drawing Figures

OPTICAL CROSSBAR SWITCHING NETWORK

BACKGROUND OF THE INVENTION

This invention relates to crosspoint-type switching networks for communication systems, particularly those networks adapted to use optical switching crosspoints.

Several proposals have previously been made for optical equivalents of more conventional switching apparatus and networks. Some earlier work in this field may be represented by the article by H. F. Taylor, "Optical Waveguide Connecting Network,"*Electronics Letters (G.B.)*, Volume 10, page 41, Feb. 21, 1974. The Taylor reference asserts that techniques for crossing one optical channel waveguide above another and for effectively supplying a switching crosspoint therebetween have not been proposed and have not been demonstrated. The alternatives, as described the Taylor reference, become extremely cumbersome. In some of the other prior art references, such as U.S. Pat. No. 3,622,792, the optical beams are freely propagating during the switching operation. In another attempt to solve the problem, U.S. Pat. No. 3,871,743, optical fiber waveguides are made to intersect a second set of guides in the switching matrix. The mechanics of aligning such arrangements in a large matrix are difficult.

It would be desirable to provide a more versatile, less problem-prone system than any of those of the prior art.

SUMMARY OF THE INVENTION

My invention is based upon the recognition that one optical waveguide can pass above another by the use of an intervening medium and provide a useful switching crosspoint. According to a feature of my invention, in an optical crosspoint switching network, a switching crosspoint is established between nonintersecting optical waveguide channels by means of a pair of controllable optical couplers, each variable into and out of coupling by controlling its proximity to its related waveguide channel in the vicinity of the crosspoint. The pair of couplers are mutually disposed so that both are in the optical communication path between the two optical waveguides.

According to another feature of my invention, a relative obliqueness of the two sets of waveguides as projected onto a common plane facilitates the coupling of the propagating light modes therebetween.

Advantageously, very broadband switched optical channels can be made available for common carrier public communication. Indeed, facility switching can be practiced in systems employing the invention because of the enormous bandwidths that can be provided in each channel and the large total bandwidth available in the optical carrier wave.

BRIEF DESCRIPTION OF THE DRAWING

Further features and advantages of my invention will become apparent from the following detailed descriptions taken together with the drawing in which.

DESCRIPTION OF ILLUSTRATIVE EMBODIMENT

Figure 1:
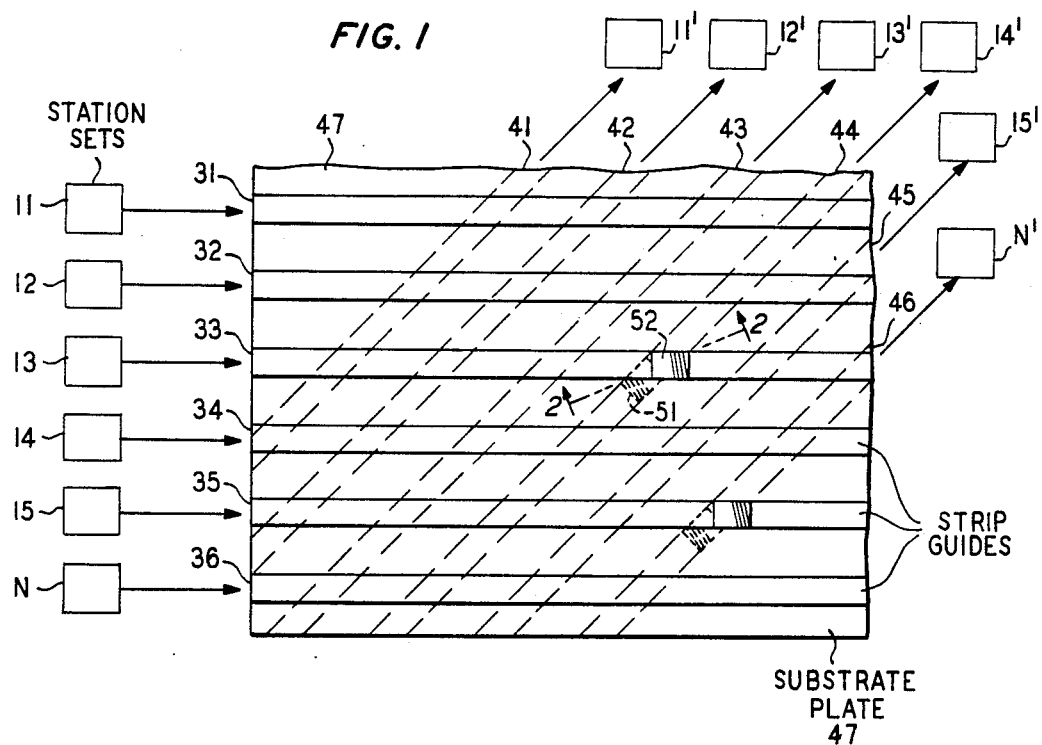
FIG. 1 is a partially pictorial and partially block diagrammatic illustration of an optical crosspoint switching matrix according to my invention.

In the embodiment of FIG. 1, it is desired to provide a crosspoint switching matrix of purely optical type between optical channels for the first appearance for respective customer station sets or other transmission facilities 11, 12, 13, 14, 15 . . . N, and optical channels extending to the second appearances for the same station sets 11', 12', 13', 14', 15' . . . N', where obviously the connection is to be established between respective appearances for different station sets. The optical channel waveguides 31 through 36 are coupled by any of the conventional means (not shown) to the respective station sets 11–N to provide the optical channels from the first appearances; and optical channel waveguides 41–46 on to the opposite side of the common substrate 47 are similarly coupled to station sets 11' – N' to provide the optical channels to the second appearances for those customers. It will be observed that the projection of one set of guides 41–46 onto the plane of the other set 31–36, or onto any common plane therebetween, defines a set of oblique intersections that locate the positions of the switching crosspoints with respect to that plane.

In particular, at the intersection of guide 33 and guide 44 there are shown the projections of couplers 51 and 52 which are disposed respectively above guide 33 and below guide 44, in other words, on opposite sides of substrate 47.

Figure 1A:
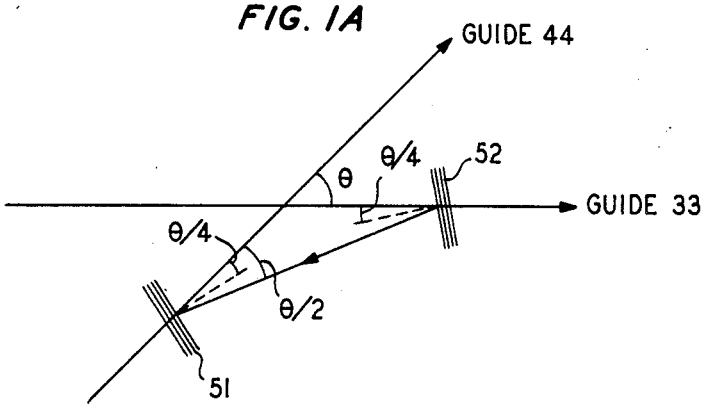
FIG. 1A is a schematic diagram of the coupling operation employed in the embodiment of FIG. 1.

As shown in the schematic diagram of FIG. 1A, the grating couplers can be oriented in a variety of angular combinations, the normals to the grating rulings being displaced by respective angles from the directions of outgoing light propagation in the adjacent guides, the sum of which angles is equal to, or no greater than, one-half of the angle between the outgoing or extended directions of propagation. In the symmetrical case, these angles are equal; and the projection of the light path into the plane of the paper, between the grating couplers 51 and 52, makes angles with respect to the guides twice as large as do the grating normals. The coupling is a reverse coupling in each case, like that of a reflector; and the gratings are oriented (in mirror-like fashion) to establish a light path between them through the substrate 47. This means that the grating normals are oriented at an angle of $\theta/4$ with respect to the corresponding guide axes, where $\theta$ is the angle between the outgoing or extended directions of propagation in the guides.

Thus, an optical mode propagating from station 13 along guide 33 is affected by coupler 52, when it is close enough, and is coupled in a mostly backward direction through substrate 47 to coupler 51, which will then couple it in a mostly backward direction into guide 44 in the direction of propagation towards the second appearance of station set 14'.

Figure 2:
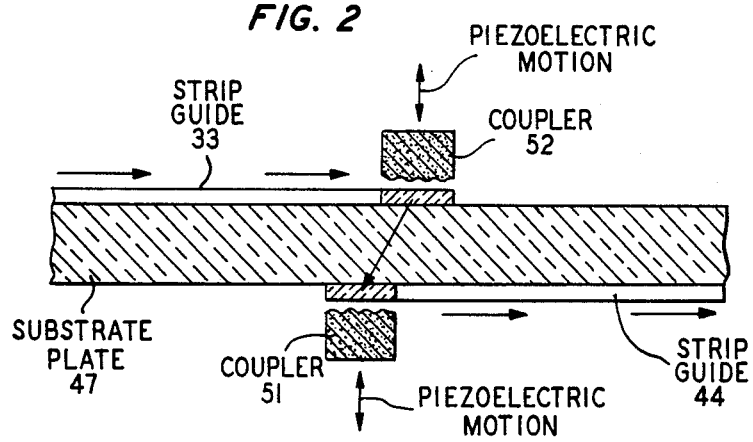
FIG. 2 shows a pictorial cross section of a typical crosspoint and the relationships of the respective optical couplers and waveguides.

In the elevation view of FIG. 2, the mode of operation of the couplers with respect to coupling to a beam in the substrate 47 may be more readily perceived. These couplers 51 and 52 are respectively movable into and out of coupling proximity to strip guides 44 and 33 respectively. For a given switching crosspoint to be operative, both couplers must approach their respective guides near the crosspoint at the same time. This change of proximity can easily be achieved by electromechanical motive means, preferably piezoelectric drivers, which are not shown. In fact, piezoelectric motion of both couplers by a distance of about 1 micrometer may be quite sufficient to induce coupling, if the motion is toward the guide, or to switch off the coupling, if motion is away from the guide, inasmuch as the evanescent optical fields of the waveguides 31–36 and 41–46 decay exponentially into the surrounding media on the sides remote from substrate 47. In order for the crosspoint to be disconnected without any disturbing crosstalk occurring through it, both couplers 51 and 52 should retract from proximity to the crosspoint when it is to be opened.

The slightly backward reflection of the beam directed through substrate 47 by grating couplers 52 and 51 is quite apparent in FIG. 2.

Illustratively, the strip guides 33 and 44 in FIG. 1 intersect at an angle of about 45°, and the grating elements of couplers 51 and 52 are normal to a line which runs at an angle 11.25° with respect to horizontal from lower left to upper right in the showing of FIG. 1A. It is along the line that the cross-sectional view of FIG. 2 is taken.

Many modifications of the details of the illustrative couplers of FIG. 2 are possible. For example, the gratings could be induced electro-optically, acousto-optically or magneto-optically, to avoid the piezoelectric motion. It should also be clear that forward grating couplers instead of reverse grating couplers could also be employed.

Nevertheless, the use of properly designed reverse couplers insures that all the light is coupled into the substrate in the proper diffraction order and none into the air or cover material.

In the case of forward grating couplers, coupler 52 should be moved towards the lower left of the crosspoint in FIG. 1 and coupler 51 would be moved toward the upper right of the crosspoint in FIG. 1. Forward grating couplers tend to lose light to higher order diffracted beams propagating from the guides into the air.

It should be clear that the other pairs of couplers are not shown in FIG. 1 at every crosspoint, even though they are intended to be there, in order not to confuse the drawing. Only a few illustrative crosspoints, another being that between guides 35 and 46, should be sufficient in FIG. 1. In practice, such a set of couplers is provided at every crosspoint.

It should be noted that any light lost in the crosspoint switching matrix of the drawing due to coupling inefficiency does not cause detrimental crosstalk between guides that are not supposed to be connected, but merely causes insertion loss in the intended connection path. The light that is not coupled merely propagates to the far end of its initial guide, for example, guide 33 and may be nonreflectively terminated, that is, absorbed by means not shown. Light, if any, coupled into the air is typically dissipated without crosstalk.

What is claimed is:

1. An optical switching network of the type employing a plurality of optical crosspoints to provide connections in an NxN network of optical waveguide communication channels, characterized in that a first plurality N of the optical waveguide channels are parallel to each other and define a first plane, a second plurality N of optical waveguide channels are parallel to each other and define a second plane which is parallel to said first plane, said waveguide channels in said first plane crossing over said waveguide channels in said second plane without intersection, each region of closest approach of one waveguide channel from said first plurality N of waveguide channels to a second waveguide channel in said second plurality N of waveguide channels defining a proposed switching crosspoint, and further characterized by including at each of the proposed switching crosspoints a first beam-to-guide (grating-type) coupler to couple the modulated optical energy from said one waveguide channel of the first plurality of waveguide channels, and laterally disposed therefrom in a direction chosen to define the optical communication path between waveguide channels a second beam-to-guide coupler to couple the energy from the first coupler into said second waveguide channel of the second plurality of waveguide channels, each of said first and second couplers being controllable between noncoupling and coupling conditions with respect to its related waveguide channel.

2. An optical switching-network of the type claimed in claim 1, including a common substrate for the first and second pluralities of optical waveguide channels, said substrate being disposed between the first plurality of channels and the second plurality of channels.

3. An optical switching network of the type claimed in claim 1 in which the beam-to-guide couplers are grating-type couplers.

4. An optical switching network of the type claimed in claim 1, in which the beam-to-guide couplers are reverse grating couplers.

5. An optical switching network of the type claimed in claim 1 in which the first and second grating-type optical couplers are disposed on the relatively remote sides of the first and second pluralities of optical waveguide channels.

6. An optical switching network of the type claimed in claim 1 in which the first and second pluralities of optical waveguide channels have respective sets of projections on a common plane parallel thereto, which sets of projections are mutually oblique.

7. An optical switching network system of the type claimed in claim 6 in which the beam-guide couplers consist of grating-type couplers having elements that lie orthogonal to normals that have angles with respect to the nearest set of projections of the first and second pluralities of optical waveguide channels, the sum of which angles is no greater than half the smallest angle between the projections of the channels of the first and second pluralities, respectively.

* * * * *